(12) United States Patent
Gampe et al.

(10) Patent No.: US 7,475,810 B2
(45) Date of Patent: Jan. 13, 2009

(54) MODULAR PROCESSING SYSTEM FOR PERSONALIZATION ELEMENTS

(75) Inventors: Thomas Gampe, Arnbruck (DE); Richard Steif, Schorndorf-Obertraubenbach (DE); Alexander Gödecke, Bernhardswald-Pettenreuth (DE)

(73) Assignee: Muhlbauer AG, Roding (DE)

( * ) Notice: Subject to any disclaimer, the term of this patent is extended or adjusted under 35 U.S.C. 154(b) by 0 days.

(21) Appl. No.: 10/548,392

(22) PCT Filed: Mar. 11, 2004

(86) PCT No.: PCT/EP2004/002501

§ 371 (c)(1),
(2), (4) Date: Dec. 4, 2006

(87) PCT Pub. No.: WO2004/081856

PCT Pub. Date: Sep. 23, 2004

(65) Prior Publication Data

US 2007/0080208 A1    Apr. 12, 2007

(30) Foreign Application Priority Data

Mar. 11, 2003 (DE) .............................. 103 10 891
Oct. 29, 2003 (DE) .............................. 103 50 488

(51) Int. Cl.
*G06K 5/10* (2006.01)

(52) U.S. Cl. .................. 235/380; 235/375; 235/381; 235/449; 235/451

(58) Field of Classification Search ............... 235/375, 235/380, 381, 449, 451
See application file for complete search history.

(56) References Cited

U.S. PATENT DOCUMENTS

| 4,825,054 | A | * | 4/1989 | Rust et al. ................. 235/380 |
| 5,266,781 | A | | 11/1993 | Warwick et al. ............ 235/375 |
| 6,082,617 | A | * | 7/2000 | Meyer-Wittreck et al. ... 235/381 |
| 6,089,457 | A | | 7/2000 | LaManna et al. ............ 235/475 |
| 6,695,205 | B1 | * | 2/2004 | Lundstrom et al. .......... 235/380 |
| 6,902,107 | B2 | * | 6/2005 | Shay et al. .................. 235/381 |

FOREIGN PATENT DOCUMENTS

| DE | 197 09 561 | 9/1998 |
| DE | 101 10 414 | 9/2002 |

* cited by examiner

*Primary Examiner*—Thien M. Le
*Assistant Examiner*—Tuyen K Vo
(74) *Attorney, Agent, or Firm*—Ballard Spahr Andrews & Ingersoll, LLP

(57) ABSTRACT

Modular processing system (1) for processing personalization elements, in particular chip cards, smart cards and/or magnetic strip cards, comprising a large number of processing modules, wherein the processing modules each comprise at least one first and at least one second sub-module (3-7; 12-20) and are arranged in a linear manner one behind the other in such a way that in each case the first sub-module (3-7) as the process module is arranged in a processing area (10) above a common table top plane (21) of a system base frame (2) and the second sub-module (12-20) as the electronics and process component module is arranged in a control and evaluation area (11) below the table top plane (21).

9 Claims, 2 Drawing Sheets

MODULAR PROCESSING SYSTEM FOR PERSONALIZATION ELEMENTS

CROSS REFERENCE TO RELATED APPLICATIONS

Figure 1:
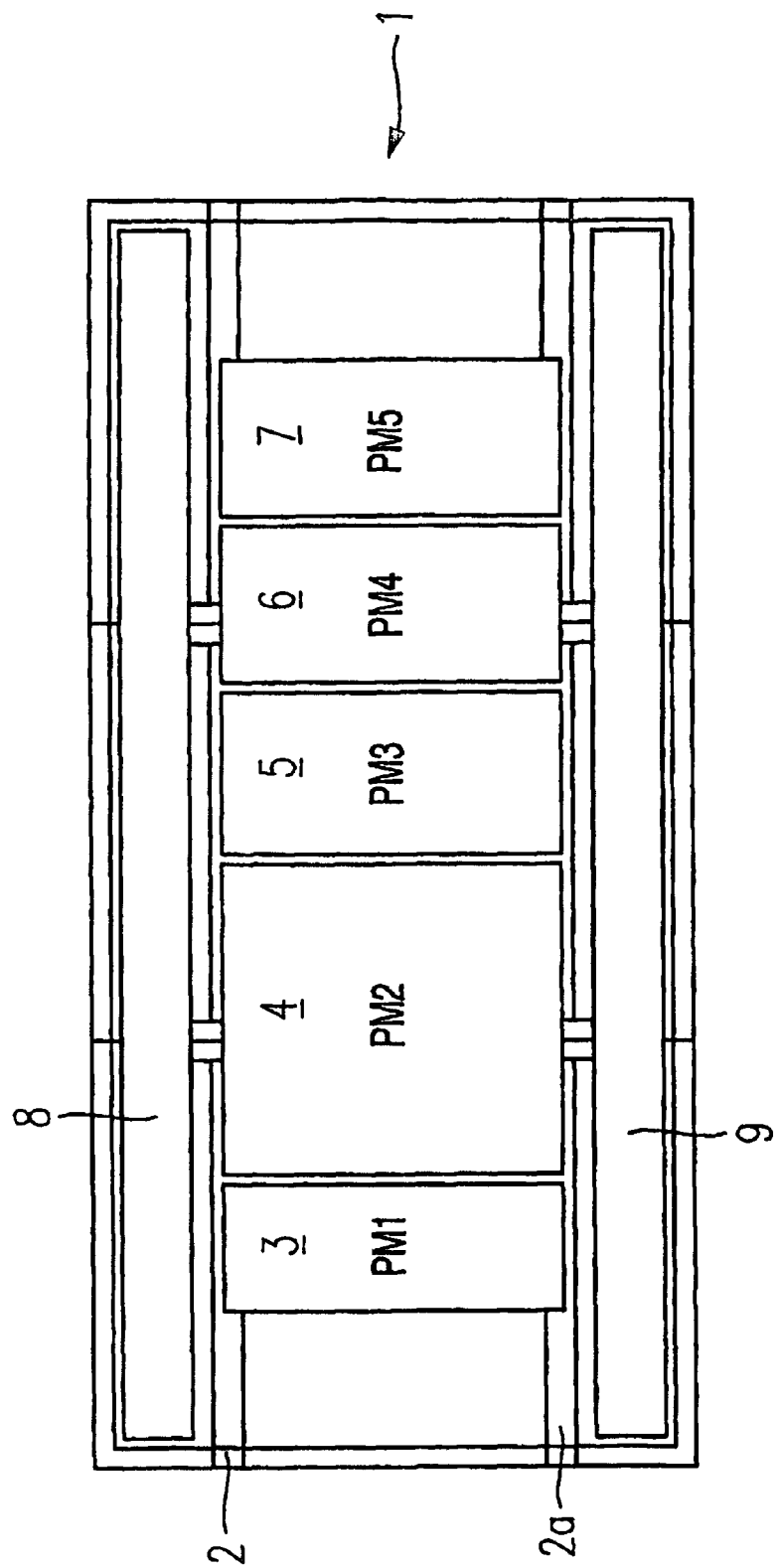

The present application claims priority to German Patent Application No. 103 10 891.2, filed Mar. 11, 2003, and German Patent Application No. 103 50 488.5, filed Oct. 29, 2003, which applications are incorporated herein fully by this reference.

The invention relates to a modular processing system for processing personalization elements, in particular chip cards, smart cards and/or magnetic strip cards, comprising a large number of processing modules, according to the preamble of claim 1.

Personalization elements such as chip cards, smart cards and/or magnetic strip cards are personalized by means of a processing system. Such personalization systems are known in a large number of different compositions and configurations which are adapted to their respective applications.

For example, there is known a processing system for personalizing chip cards in which individual processing modules can be configured as independent units to form an overall system, wherein the order of the individual processing modules can be configured almost at will. Such a processing system is described in U.S. Pat. No. 5,266,781. The individual card processing modules described in said document are intended for the personalization of credit cards, comprising the processing steps of magnetic strip encoding, card embossing and exertion of thermal pressure to form images on the credit cards. Such processing systems can also be configured as compact systems for office use.

However, compact constructions of processing systems in which use is made of processing processes which require a much higher outlay in terms of device technology, such as the inscription of cards by means of a laser device for example, are currently not possible. This is because the individual processing modules are too large and thus too awkward. Accordingly, the processing modules and components of a personalization system or processing system in which personalization takes place by means of a laser device are connected to the actual system from outside. A modular design in the above sense is thus not possible.

Rather, there is a desire for alternative arrangements of the modules, as described for example in DE 101 10 414 A1. In such a personalization system, use is made of a rotary table system design which makes it possible to arrange at least two laser systems on a common rotary table by means of rotary table handling. All the processing modules are arranged around this rotary table so that the accessibility to the corresponding components, for example in order to carry out repairs, becomes more difficult and thus the system is difficult to maintain.

The personalization systems described in DE 101 10 414 A1 have a multi-job capability, that is to say they can process more than one processing job at the same time. This is advantageous when using the systems to personalize bank cards, in which often a high number of relatively small quantities, that is to say so-called post-productions, have to be moved through the system. In order not to always have to start a new processing job in the system, the system can automatically process different jobs depending on the composition of the orders sent to the system.

DE 197 09 561 C2 relates to a personalization system which carries out a parallelization of individual processing steps or processes in order to increase the throughput of the system. In addition, use is made of direct card transfer from module to module as a handling module, in order thus to keep the system compact and small. This system is also able to carry out multiple jobs. Such parallel arrangements of individual modules have reduced accessibility when carrying out maintenance and also reduced reliability of the system as a whole in terms of its processing steps, on account of the complex overall construction.

Accordingly, it is an object of the present invention to provide a modular processing system for processing personalization elements, which in terms of its overall construction is accessible and easy to maintain and in terms of its operation is reliable and efficient.

This object is achieved by a processing system which is characterized by a linear arrangement of individual processing modules, wherein the processing modules are each arranged in sub-modules above and below at least one table top plane of a system base frame.

The sub-modules arranged above the table top plane are designed as actual process modules, which contain all the essential components for directly processing or personalizing the personalization elements, such as cards.

By contrast, the sub-modules arranged below the table top plane contain electronic components and/or process components which belong to the actual process modules arranged above the table top plane. By virtue of such a splitting of the modular processing system into an upper processing area and a lower control and evaluation area, the electronic components and/or process components belonging to the actual process modules can be accommodated below the processing plane in a space-saving manner, wherein this control and evaluation area can be covered by covering base frame panels. Visibility of the overall system and easy accessibility from outside and also easy maintenance of the system are improved as a result.

According to one preferred embodiment, a large number of table tops which are respectively assigned to the processing modules and are designed to support the process modules are arranged in the table top plane, wherein the depth dimensions of the table tops are smaller than the depth dimensions of the system base frame extending therebelow. The result of this is that advantageously in each case at least one cable duct which runs parallel to the longitudinal axis of the system and is designed to receive cables connecting the modules can be arranged on either side of the linearly arranged process modules and table tops. Such an arrangement of the cable ducts allows the greatest possible accessibility and ease of maintenance of the cable connections which are necessary for connecting the electronics and process component modules in the lower control and evaluation area to the process modules in the upper processing area. Moreover, simple replacement of individual electronic components is possible in this way by removing the associated cable connection, without having to remove from the upper area the process module belonging to this electronic component. If the overall modular processing system is disrupted, this permits rapid replacement of individual modules and therefore short repair times.

In order to prevent soiling of the cables arranged in the cable ducts and obstruction caused by hanging cables, the cable ducts advantageously have covers which, by means of clamp connections, hinge connections or the like, allow rapid opening and closing of the cable ducts.

Preferably, the control and evaluation area can be covered by means of base frame panels in such a way that soiling of the electronics and process component modules is prevented. This has an advantageous effect on the durability of the system.

In order to configure the modular processing system as a compact unit in as flexible a manner as possible, including for use thereof for the decentralized personalization of cards in an office, in particular for the personalization of chip cards in a small or medium quantity, the bottom of the system base frame is provided with roller-like elements which allow rapid displacement of the compact system as a whole.

Advantageously, such systems can be used both for ID use, in which use is made of an encoding module, a printing module, a laser module and a CS module and also a base module for introducing and removing the cards, and also for an EMC application with a base module, a magnetic module, an encoding module and an embossing module or for a GSM application with a base module, an encoding module and a laser module. Further applications which require a plurality of modules are also conceivable.

Figure 2:
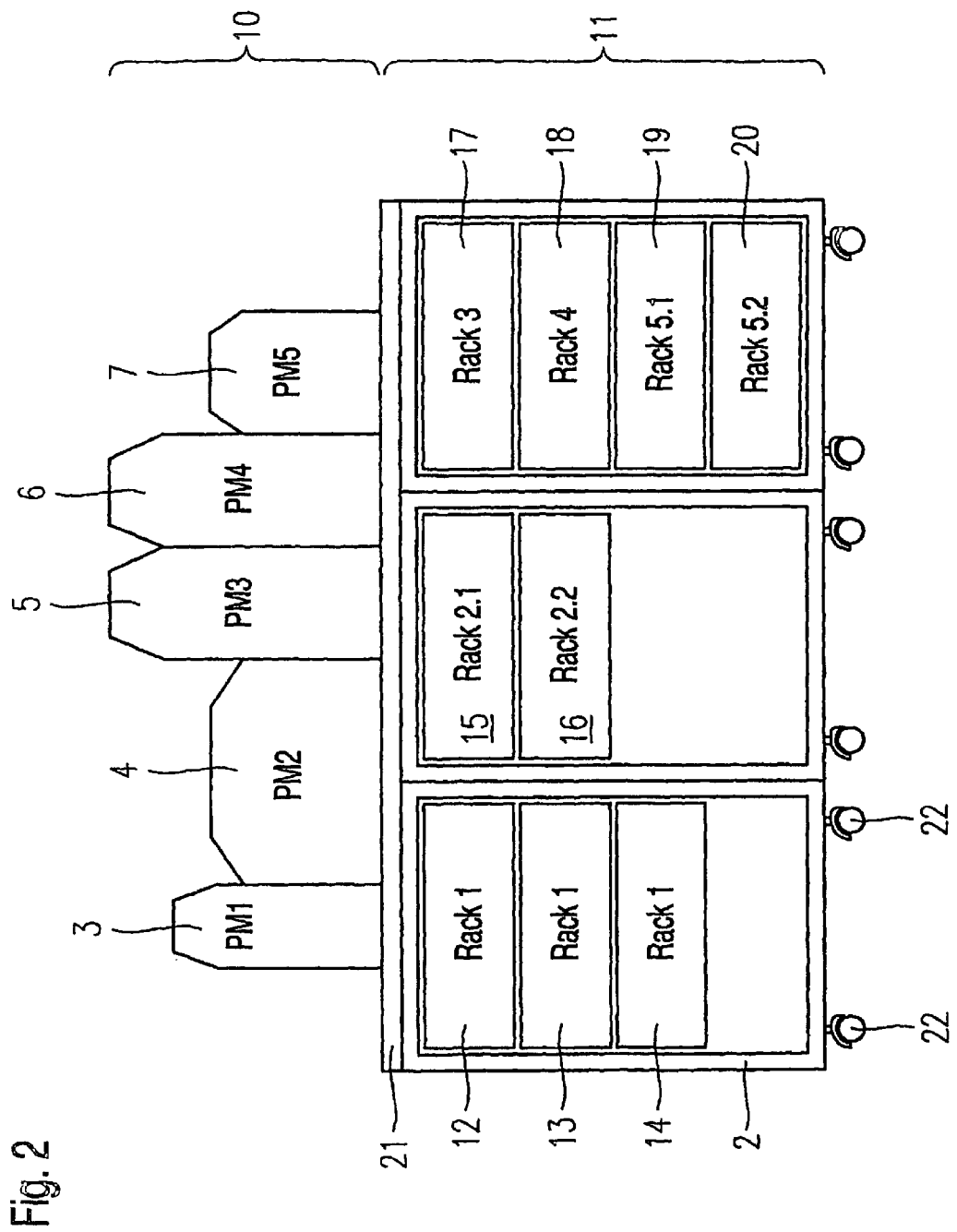

Further embodiments emerge from the dependent claims. Advantages and expedient features can be found in the following description in conjunction with the drawing. In the drawing:

FIG. 1 shows a schematic plan view of a modular processing system according to one embodiment of the invention, and FIG. 2 shows a schematic side view of the modular processing system according to the embodiment of the invention.

FIG. 1 shows a plan view of a modular processing system according to one embodiment of the invention. As can be seen from the figure, the modular processing system 1 has a system base frame 2 with table top supports 2a made of aluminum profiled bars, which are provided for placing thereon individual table tops (not shown here) in order to support process modules 3, 4, 5, 6 and 7 fixed thereon and to connect them to the system base frame 2. The process modules 3-7 can preferably be displaced on the table top supports 2a arranged on either side, in the longitudinal direction of the system, that is to say to the left or to the right.

Both the process modules and the table tops arranged therebelow each have a depth dimension which is smaller than the overall depth dimension of the system base frame 2. Here, the term "depth dimension" means the external dimension of the table top or base frame which runs from the bottom to the top in the drawing. In this way, cable ducts 8 and 9 for receiving cables can be arranged on either side of the process modules 3-7 and table tops. Such cables serve to connect the process modules 3-7 arranged on top to individual electronic racks arranged below. Thus, electronic wiring for connecting the individual process modules to the electronic racks arranged therebelow is provided on either side of the process modules in the cable ducts 8 and 9.

By arranging the process modules on individual table tops, which in turn are arranged on table top supports 2a, a cost-effective and compact construction of the modular processing system can be achieved. All the mechanical and electronic components and also the process components are accommodated in such a system 1.

FIG. 2 shows a schematic side view of the modular processing system according to the embodiment of the invention. As can be seen from the figure, the process modules 3-7 are arranged above a table top plane 21 in a processing area 10 of the system 1. The electronics component and process component modules, that is to say the electronic racks 12-20, are arranged below the table top plane 21 in a control and evaluation area 11. The arrangement of the electronic racks 12-20 is advantageously configured in such a way that the electronic racks belonging to a selected process module are arranged below this process module.

On account of the fact that the individual processing modules are split into upper and lower modules, the system has greater modularity than the previously known systems. To this end, the process modules 1-7 are mounted on small table tops (not shown) assigned thereto which are located in the table top plane 21. Such table tops are in turn arranged on the table top supports 2a.

The system 1 itself is mounted on movable elements, preferably roller-like elements 22, so that it can be moved rapidly and simply from one room to another as a compact system.

The electronic racks may preferably be covered with covering base frame panels (not shown here) in such a way that soiling of said racks from outside is prevented.

The system according to the invention has a linear arrangement of individual process modules in conjunction with rapid processing processes which lead to an accessible and efficient system. The accessibility and reliability of the components and simple access to the cards located in the system are basic prerequisites for acceptance of a card personalization system by users.

All the components and parts described in the application are to be regarded as essential to the invention both individually and in combination. Variations thereof are known to the person skilled in the art.

LIST OF REFERENCES 1 modular processing system
2 system base frame
2a table top supports
3, 4, 5, 6, 7 process modules
8, 9 cable ducts
10 processing area
11 control and evaluation area
12, 13, 14, 15,
16, 17, 18, 19, 20 electronic racks
21 table top plane
22 roller-like elements

The invention claimed is:

1. A modular processing system for processing personalization elements, in particular chip cards, smart cards and/or magnetic strip cards, comprising a plurality of processing modules which each comprise at least one first and at least one second sub-module and wherein the processing modules are arranged in a linear manner one behind the other along a longitudinal axis, characterized in that in each case the first sub-module is the actual process module, which contains all the essential modules for directly processing or personalizing the personalization element, wherein the first sub-module is arranged in a processing area above a common table top plane of a system base frame, and the second sub-module is the electronics and/or process component belonging to the actual process module and is arranged in a control and evaluation area below the table top plane, and at least one cable duct which runs parallel to the longitudinal axis of the system for receiving electronic cables connecting the first and second sub-modules, wherein said at least one cable duct is arranged on either side of the linearly arranged first sub-modules and table tops.

2. The modular processing system as claimed in claim 1, comprising a number of individual table tops which are respectively assigned to the first sub-modules as the actual processing modules, which are designed to support the actual process modules, and which are arranged in the table top plane, wherein the depth dimensions of each individual table top is smaller than the depth dimensions of the system base frame extending therebelow.

3. The modular processing system as claimed in claim 1, characterized in that the cable ducts are provided with covers.

4. The modular processing system as claimed in claim 1, characterized in that the control and evaluation area can be covered by means of base frame panels.

5. The modular processing system as claimed in claim 1, characterized in that the system base frame comprises, and can be moved by means, of roller elements.

6. The modular processing system as claimed in claim 1, characterized in that each second sub-module can be arranged within the control and evaluation area independently of the arrangement positioning within said linear manner arrangement of the first sub-modules of the corresponding first sub-module to which said second sub-module belongs.

7. The modular processing system as claimed in claim 1, characterized in that the system is adapted such that a first one of the second sub-modules can be arranged in the control and evaluation area above or below a second one of the second sub-modules.

8. The modular processing system as claimed in claim 1, characterized in that the system is adapted such that the second sub-modules can be replaced without having to remove from the upper processing area the first sub-module to which the second sub-module belongs.

9. The modular processing system as claimed in claim 1, characterized in that the second sub-module is an electronic rack belonging to the process module of the first sub-module to which said second sub-module belongs.

* * * * *